United States Patent [19]

Mitsumasa et al.

[11] Patent Number: 4,850,192
[45] Date of Patent: Jul. 25, 1989

[54] HYDRAULICALLY OPERATED POWER TRANSMISSION

[75] Inventors: Furumoto Mitsumasa, Saitama; Yoshizawa Hiroshi, Tochigi, both of Japan

[73] Assignee: Honda Giken Kogyo Kabushiki Kaisha, Tokyo, Japan

[21] Appl. No.: 132,354

[22] Filed: Dec. 14, 1987

[30] Foreign Application Priority Data

Dec. 12, 1986 [JP] Japan .................................. 61-296245

[51] Int. Cl.$^4$ ............................................. F16D 31/02
[52] U.S. Cl. ........................................ 60/468; 60/487; 60/494
[58] Field of Search .................. 60/468, 494, 487, 489, 60/493

[56] References Cited

U.S. PATENT DOCUMENTS

| | | | |
|---|---|---|---|
| 2,624,321 | 1/1953 | Levetus | 60/468 X |
| 3,382,813 | 5/1968 | Schauer . | |
| 3,449,912 | 6/1969 | Dunikowski | 60/468 X |
| 3,455,184 | 7/1969 | Frandsen . | |
| 3,508,401 | 4/1970 | Aplin . | |
| 3,555,817 | 1/1971 | Hann | 60/468 X |
| 3,999,387 | 12/1976 | Knopf . | |
| 4,087,969 | 5/1978 | Takahashi . | |
| 4,120,540 | 10/1978 | Devlieg . | |
| 4,187,877 | 2/1980 | Hodgson . | |
| 4,548,036 | 10/1985 | Matsuda . | |
| 4,699,571 | 10/1987 | Bartholomaus . | |

FOREIGN PATENT DOCUMENTS

| | | |
|---|---|---|
| 1625039 | 5/1967 | Fed. Rep. of Germany . |
| 156521 | 9/1982 | Fed. Rep. of Germany ........ 60/468 |
| 473997 | 1/1967 | Switzerland . |

Primary Examiner—Edward K. Look
Attorney, Agent, or Firm—Lyon & Lyon

[57] ABSTRACT

A hydraulically operated power transmission includes a hydraulic pump drivable by a power source, a hydraulic motor for driving a device, a primary oil passage leading from the hydraulic pump to the hydraulic motor, a secondary oil passage leading from the hydraulic motor to the hydraulic pump, a plurality of relief valves openable at higher and lower pressure levels, respectively, a shuttle valve for selectively connecting the relief valves to the primary and secondary oil passages in response to the difference between oil pressures in the primary and secondary oil passages, and a restriction disposed in an oil passageway extending from the primary oil passage through the shuttle valve to the relief valve openable at the lower pressure level, the restriction being located between the shuttle valve and the relief valve openable at the lower pressure level. When oil pressure is produced by the hydraulic pump to drive the hydraulic motor following a condition in which the load is absorbed by the hyraulic pump, the oil pressure is limited by the restriction without being released, and rises quickly enough to shift the shuttle valve.

5 Claims, 2 Drawing Sheets

HYDRAULICALLY OPERATED POWER TRANSMISSION

BACKGROUND OF THE INVENTION

The present invention relates to a hydraulically operated power transmission including a hydraulic pump and a hydraulic motor which are interconnected by a closed hydraulic circuit, and more particularly to a hydraulically operated power transmission that can transmit driving power from a hydraulic pump to a hydraulic motor very quickly following a condition in which driving power was transmitted from the hydraulic motor to the hydraulic pump.

Various power transmissions are known in the art. One known design is a hydraulically operated power transmission which has a hydraulic pump driven by the driving power of an engine and a hydraulic motor rotated by oil pressure developed by the hydraulic pump. The rotative power of the hydraulic motor is transmitted to an input shaft of a device to which the driving power is to be transmitted.

In the known hydraulically operated power transmission, while the device is being driven by the driving power from the engine, oil pressure is transmitted from the hydraulic pump to the hydraulic motor, and the device is driven by the driving power generated by the hydraulic motor. If the oil pressure produced by the hydraulic pump is increased beyond a prescribed pressure level, the excessive oil pressure is released through a high-pressure relief valve.

When so-called engine braking is relied upon, the engine is driven by the driving power from drive wheels. At this time, since the hydraulic motor actuates the hydraulic pump, the oil pressure acting on the hydraulic motor from the hydraulic pump is released through a shuttle valve from a low-pressure relief valve into an oil tank. At the time of initiating acceleration from this engine braking condition, since the oil pressure is released via the shuttle valve from the low-pressure relief valve, it is necessary to switch over the shuttle valve to cut off the oil passage leading to the low-pressure relief valve, so that the oil pressure produced by the hydraulic pump can quickly be transmitted to the hydraulic motor.

If the shuttle valve is not quickly switched over, the oil pressure from the hydraulic pump would continuously be released, and hence would not immediately be applied to the hydraulic motor. Therefore, the hydraulic pump would be idly rotated, and the acceleration response would poor.

SUMMARY OF THE INVENTION

In view of the aforesaid problems of the conventional hydraulically operated power transmission, it is an object of the present invention to provide a hydraulically operated power transmission that can transmit driving power from a hydraulic pump to a hydraulic motor very quickly following a condition in which driving power was transmitted from the hydraulic motor to the hydraulic pump.

According to the present invention, there is provided a hydraulically operated power transmission which includes a hydraulic pump drivable by a power source, a hydraulic motor for driving a device, a primary oil passage leading from the hydraulic pump to the hydraulic motor, a secondary oil passage leading from the hydraulic motor to the hydraulic pump, a plurality of relief valves openable at higher and lower pressure levels, respectively, a shuttle valve for selectively connecting the relief valves to the primary and secondary oil passages in response to the difference between the oil pressure in the primary oil passage and the oil pressure in the secondary oil passage, and a restriction disposed in an oil passageway, which oil passageway extends from the primary oil passage through the shuttle valve to the relief valve openable at the lower pressure level, the restriction being located between the shuttle valve and the relief valve openable at the lower pressure level.

When the hydraulic motor is actuated by the hydraulic pump following a condition in which oil pressure is released from the hydraulic pump to enable the hydraulic pump to absorb the load, the oil pressure produced by the hydraulic pump is limited by the restriction and hence can be increased quickly enough without an undesired power loss the power transmission. As a result, the shuttle valve can be quickly switched over.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
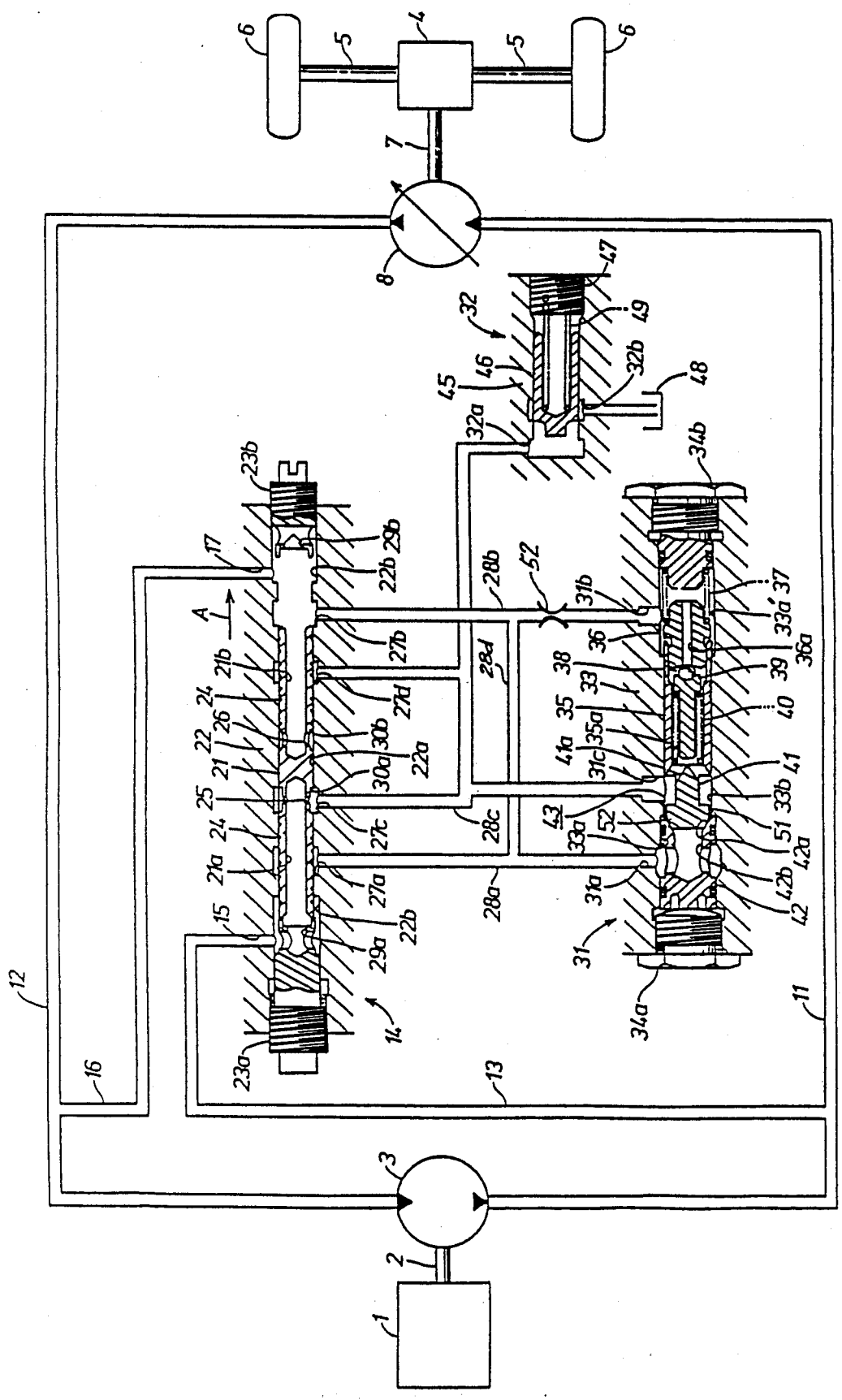
FIG. 1 is a schematic circuit diagram, partly shown in block form, of a hydraulic power transmission circuit of a motor vehicle employing a hydraulically operated power transmission according to the present invention.

FIG. 1 schematically shows a hydraulic power transmission circuit of a motor vehicle having a hydraulically operated power transmission according to the present invention. As shown on the lefthand side of FIG. 1, a hydraulic pump 3 is coupled to the output shaft 2 of an engine 1. As shown on the righthand side of FIG. 1, a differential 4, which is a device to which driving power is to be transmitted, has opposite drive shafts 5 coupled to drive wheels 6, respectively, of a motor vehicle. The differential 4 has an input shaft 7 connected to a hydraulic motor 8, which hydraulic motor may, for example, be of the variable displacement type. The hydraulic pump 3 and the hydraulic motor 8 are interconnected by a primary oil passage 11 leading from the hydraulic pump 3 to the hydraulic motor 8 and a secondary oil passage 12 leading from the hydraulic motor 8 to the hydraulic pump 3. The hydraulic pump 3, the hydraulic motor 8, and the primary and secondary oil passages 11, 12 jointly constitute a closed hydraulic circuit.

A first branch oil passageway 13 branched from the primary oil passage 11 is held in communication with a first inlet 15 of a shuttle valve 14. A second branch oil passageway 16 branched from the secondary oil passage 12 is held in communication with a second inlet 17 of the shuttle valve 14. The shuttle valve 14 comprises a three-position, four-port valve. In FIG. 1, the shuttle valve 14 is shown as being in a position in which oil pressure from the hydraulic motor 8 is higher than oil pressure from the hydraulic pump 3. The shuttle valve 14 has a cylinder 22 having a central smaller-diameter hole 22a and two larger-diameter holes 22b in its opposite ends, and a spool 21 axially slidably disposed in the smaller-diameter hole 22a. The spool 21 has two holes 21a, 21b defined separately therein and extending from the oppposite ends toward the center of the spool 21.

Blind plugs 23a, 23b are threaded respectively in the larger-diameter holes 22b of the cylinder 22. The blind plugs 23a, 23b have free ends located within the cylinder 22 which are radially spaced from the inner surfaces of the larger-diameter holes 22b and which have holes 29a, 29b defined therein and opening axially at the end faces and also opening radially at the outer peripheral surfaces of the free ends of the blind plugs 23a, 23b.

Therefore, even when the spool 21 is axially shifted in one direction to close the free end face of one of the blind plugs 23a, 23b, working oil pressure can act on the spool 21 through the holes 29a, 29b. The spool 21 also has a pair of circumferential annular grooves 30a, 30b defined at different locations in the outer circumferential surfaces thereof in the vicinity of the center thereof. The annular grooves 30a, 30b communicate with the holes 21a, 21b, respectively, through diametric communication holes 25, 26 defined in the spool 21. The primary branch oil passageway 13 is held in communication with the annular groove 30a through the communication hole 25 which is of a relatively small diameter and serves as a restriction. A number of annular labyrinth grooves 24 are defined in the outer circumferential surface of the spool 21 at axially spaced intervals. These annular labyrinth grooves 24 reduce the resistance to sliding movement of the spool 21, so that the spool 21 can smoothly be moved under quite a small force.

The inner peripheral surface of the smaller-diameter hole 22a of the cylinder 22 has a plurality of circumferential annular grooves 27a through 27d spaced in the axial direction. The annular groove 27a which is closest to the primary branch oil passageway 13 is held in communication with a first inlet 31a of a high-pressure relief valve 31 through an oil passageway 28a. The annular groove 27b which is closest to the secondary branch oil passageway 16 is held in communication with a second inlet 31b of the high-pressure relief valve 31 through an oil passageway 28b and a restriction 52 in the oil passageway 28b. The oil passageway 28a communicates via an oil passageway 28d with the oil passageway 28b at a position upstream of the restriction 52 in the direction in which oil flows through the oil passageway 28b. The annular grooves 27c, 27d between the annular grooves 27a, 27b communicate with an outlet 31c of the high-pressure relief valve 31 through a single oil passageway 28c which is branched to an inlet 32a of a low-pressure relief valve 32. The low-pressure relief valve 32 has an outlet 32b communicating with an oil tank 48. Working oil that has returned to the oil tank 48 is fed back to the closed hydraulic circuit by a pump (not shown).

The high-pressure relief valve 31 is shown in a neutral position. Blind plugs 34a, 34b are threaded respectively in larger-diameter holes or oil chambers 33a, 33a' defined in the opposite ends of a cylinder 33 of the high-pressure relief valve 31. A plunger 35 is axially slidably disposed in a central smaller-diameter hole 33b defined in the cylinder 33. The plunger 35 has an axial through hole 35a defined therein, with a valve seat 36 being partly received slidably in the righthand portion of the hole 35a. The valve seat 36 has an axial through hole 36a defined therein. A compression coil spring 37 is interposed between the valve seat 36 and the blind plug 34b for normally urging the valve seat 36 toward the hole 35a.

The plunger 35 has a lefthand end (as shown) against which an end of a poppet 41 serving as a main valve is held. The poppet 41 has a groove 41a defined in the end thereof obliquely radially outwardly from within the hole 35a to provide communication between the hole 35a and the oil passageway 28c. A presser 39 and a compression coil spring 40 are disposed in the hole 35a between a ball 38 and the end of the poppet 41 for forcing the ball 38 to close the through hole 36a of the valve seat 36, the ball 38 being spring-biased through the presser 39. A bushing 42 is fitted between the poppet 41 and the blind plug 34a and has on one end a valve seat 42a for the poppet 41 and the other end held against the free end of the blind plug 34a. The bushing 42 has a hole 42b defined therein and providing communication between the oil passageway 28a and the oil passageway 28c through the valve seat 42a.

The valve seat 42a has a conical surface flaring toward the poppet 41, which has a frustoconical head 52 directed toward the valve seat 42a and engaging the valve seat 42a to close the hole 42b. The head 52 has an outer periphery 51 having a diameter which is slightly smaller than the inside diameter of the smaller-diameter hole 33b, with a small gap or clearance 43 defined between the outer periphery 51 and the inner peripheral surface of the smaller-diameter hole 33b. Therefore, when the poppet 41 is pushed in a direction away from the valve seat 42a by working oil which has entered through the oil passageway 28a, the working oil gradually flows through the gap 43 into the oil passageway 28c. Therefore, the working oil does not abruptly flow into the oil passageway 28c, and hence the oil pressure is stabilized and noise due to chattering is not caused. By threading in or out the blind plug 34a, the bushing 42 can be moved in a direction into or out of the cylinder 33 to regulate the pressure level at which the high-pressure relief valve 31 can operate.

The low-pressure relief valve 32 has a cylinder 45 and a piston 46 axially slidably received in the cylinder 45. A compression coil spring 49 is disposed between the piston 46 and a blind screw 47 threaded in and closing the open end of the cylinder 45. The piston 46 is normally urged by the compression coil spring 49 to close the outlet 32b communicating with the oil tank 48.

For transmitting the driving power from the engine 1 to the drive wheels 6, oil pressure generated by the hydraulic pump 3 is transmitted through the primary oil passage 11 to the hydraulic motor 8 to rotate the latter.

When a relatively high oil pressure is developed in the primary oil passage 11, it is transmitted via the primary branch oil passageway 13 into the shuttle valve 14, moving the spool 21 in the direction of the arrow A. When the shuttle valve 14 reaches the position shown in FIG. 2, the primary branch oil passageway 13 is brought into communication with the oil passageway 28a. The working oil now enters the high-pressure relief valve 31 and pushes the poppet 41 to communicate the oil passageway 28a with the oil passageway 28c. The working oil finds its way through the oil passageway 28c into the low-pressure relief valve 32 in which the oil pressure pushes the piston 46 until the outlet 32b is opened. The working oil then returns from the outlet 32b into the oil tank 48, whereupon the oil pressure in the primary oil passage 11 is lowered.

Figure 2:
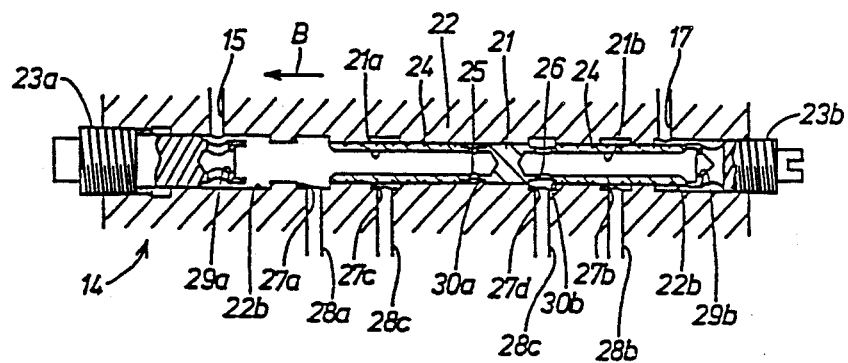
FIG. 2 is a cross-sectional view of a shuttle valve at the time a hydraulic motor is driven by oil pressure from a hydraulic pump.

When engine braking is applied, no driving power is produced from the engine 1, and driving power is transmitted from the drive wheels 6 to the engine 1. At this time, the hydraulic motor 8 is rotated by the drive wheels 8 for thereby developing a higher oil pressure in the secondary oil passage 12 than in the primary oil passage 11. The higher oil pressure is transmitted via the secondary branch oil passageway 16 into the shuttle valve 14 in which the oil pressure acts to move the spool 21 in the direction of the arrow B (FIG. 2). The spool 21 finally reaches the position of FIG. 1, whereupon the secondary oil passage 12 communicates with the oil passageway 28b. The working oil flows through the oil passageways 28d, 28a and via the first inlet 31a into the oil chamber 33a in the high-pressure relief valve 31, and also flows through the restriction 52 and via the second inlet 31b into the oil chamber 33a' in the high-pressure relief valve 31, in which the oil pressure acts on the ball 38 through the hole 36a and pushes the ball 38. The working oil in the oil chamber 33a' now leaks through the hole 36a. A difference is now developed between the oil pressures in the oil chambers 33a, 33a', pushing the poppet 41 to provide communication between the oil passageways 28a, 28c. Therefore, the working oil flows through the low-pressure relief valve 32 back into the oil tank 48.

When the rotational speed of the engine 1 is increased for acceleration from the condition of FIG. 1, oil pressure developed by the hydraulic pump 3 acts on the lefthand end (as shown in FIG. 1) of the shuttle valve 14 through the primary oil passage 11 and the primary branch oil passageway 13. Since the spool 21 of the shuttle valve 14 is in the position of FIG. 1 during the enging braking, the communication hole 25 and the annular groove 27c are held in communication with each other. Thus, the working oil might be released from the hole 21a of the spool 21 via the communication hole 25 into the oil passageway 28c. The oil pressure in the primary oil passage 11 might not be increased, and the engine 1 might be raced.

Actually, however, the communication hole 25 is of a small diameter and serves as a restriction, the oil flow therethrough is limited, and the working oil is prevented from being immediately discharged from the communication hole 25 into the oil passageway 28c. Accordingly, the working oil flowing into the shuttle valve 14 is well effective in acting on the spool 21 to move the same in the direction of the arrow A, so that the shuttle valve 14 is quickly switched over.

With the present invention, as described above, when high oil pressure is produced from the hydraulic pump to actuate the hydraulic motor, the oil pressure is limited or substantially prevented by the restriction of the spool from being released and effectively acts on the spool to move the same for quickly switching over the shuttle valve. Consequently, when the hydraulic motor is actuated by the hydraulic pump following a condition in which the load is absorbed by the hydraulic pump, the oil pressure can be increased quickly enough and an undesired power loss is reduced in the power transmission.

Although a certain preferred embodiment has been shown and described, it should be understood that many changes and modifications may be made therein without departing from the scope of the appended claims.

What is claimed is:

1. A hydraulically operated power transmission comprising:
   a hydraulic pump drivable by a power source;
   a hydraulic motor for driving a device;
   a primary oil passage leading from said hydraulic pump to said hydraulic motor;
   a secondary oil passage leading from said hydraulic motor to said hydraulic pump;
   a plurality of relief valves openable at higher and lower pressure levels, respectively;
   a shuttle valve for selectively connecting said relief valves to said primary and secondary oil passages in response to the difference between oil pressures in said primary and secondary oil passages; and
   a restriction disposed in an oil passageway extending from said primary oil passage through said shuttle valve to said relief valve openable at the lower pressure level, said restriction being located between said shuttle valve and said relief valve openable at the lower pressure level.

2. A hydraulically operated power transmission according to claim 1, wherein said restriction is provided in said shuttle valve.

3. A hydraulically operated power transmission comprising:
   a hydraulic pump drivable by a power source;
   a hydraulic motor for driving a device;
   a primary oil passage leading from said hydraulic pump to said hydraulic motor;
   a secondary oil pasage leaading from said hydraulic motor to said hydraulic pump;
   a plurality of relief valves openable at higher and lower pressure levels, respectively;
   a shuttle valve for selectively connecting said relief valves to said primary and secondary oil passages in response to the difference between oil pressures in said primary and secondary oil passages; and
   a restriction disposed in an oil passageway extending from said primary oil passage through said shuttle valve to said relief valve openable at the lower pressure level, said restriction being located between said shuttle valve and said relief valve openable at the lower pressure level;
   wherein said restriction is provided in said shuttle valve;
   wherein further said shuttle valve includes an axially movable spool, and said restriction comprises a hole of a small diameter defined in said spool.

4. A hydraulically operated power transmission comprising:
   a hydraulic pump drivable by a power source;
   a hydraulic motor for driving a device;
   a primary oil passage leading from said hydraulic pump to said hydraulic motor;
   a secondary oil passage leading from said hydraulic motor to said hydraulic pump, said hydraulic motor being capable of providing oil under pressure through said secondary oil passage to said hydraulic pump for rotating said hydraulic pump when a power source braking condition exists;
   a plurality of relief valves openable at higher and lower pressure levels, respectively;
   a shuttle valve for selectively connecting said relief valves to said primary and secondary oil passages in response to the difference between oil pressures in said primary and secondary oil passages; and
   a restriction disposed in an oil passageway extending from said primary oil passage through said shuttle valve to said relief valve openable at the lower pressure level, said restriction being located between said shuttle valve and said relief valve openable at the lower pressure level.

5. A hydraulically operated power transmission according to claim 4, wherein said restriction is provided in said shuttle valve.

* * * * *